United States Patent
Kuroishi et al.

(10) Patent No.: US 7,676,701 B2
(45) Date of Patent: Mar. 9, 2010

(54) COMPUTER READABLE MEDIUM STORING AN ERROR RECOVERY PROGRAM, ERROR RECOVERY METHOD, ERROR RECOVERY APPARATUS, AND COMPUTER SYSTEM

(75) Inventors: Norihiko Kuroishi, Kanagawa (JP); Takeshi Kamimura, Kanagawa (JP); Seiji Suzuki, Kanagawa (JP); Jun Kitamura, Kanagawa (JP); Hisayoshi Mori, Kanagawa (JP); Kazuhiro Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 730 days.

(21) Appl. No.: 11/606,668

(22) Filed: Nov. 30, 2006

(65) Prior Publication Data

US 2008/0010483 A1    Jan. 10, 2008

(30) Foreign Application Priority Data

May 11, 2006    (JP)    ............................ P2006-132938

(51) Int. Cl.
    *G06F 11/00* (2006.01)
(52) U.S. Cl. ........................................................ 714/43
(58) Field of Classification Search .................... 714/43
    See application file for complete search history.

(56) References Cited

U.S. PATENT DOCUMENTS

| | | | | | |
|---|---|---|---|---|---|
| 3,721,959 | A | * | 3/1973 | George | 714/704 |
| 5,611,069 | A | * | 3/1997 | Matoba | 711/114 |
| 5,771,467 | A | * | 6/1998 | Sato | 455/557 |
| 7,082,107 | B1 | * | 7/2006 | Arvelo | 370/311 |
| 7,234,086 | B1 | * | 6/2007 | de Koos et al. | 714/704 |
| 7,386,767 | B1 | * | 6/2008 | Xue et al. | 714/704 |
| 7,433,318 | B2 | * | 10/2008 | Isonuma | 370/242 |
| 2002/0027731 | A1 | * | 3/2002 | Arakawa et al. | 360/53 |
| 2003/0142003 | A1 | * | 7/2003 | Horst et al. | 342/42 |
| 2004/0078685 | A1 | * | 4/2004 | Glass | 714/38 |
| 2005/0132030 | A1 | * | 6/2005 | Hopen et al. | 709/223 |
| 2005/0174948 | A1 | * | 8/2005 | Isonuma | 370/241 |
| 2006/0056356 | A1 | * | 3/2006 | Arvelo | 370/332 |
| 2006/0195624 | A1 | * | 8/2006 | Chikusa et al. | 710/5 |
| 2006/0230306 | A1 | * | 10/2006 | Richards et al. | 714/7 |
| 2006/0293777 | A1 | * | 12/2006 | Breitgand et al. | 700/108 |
| 2007/0121447 | A1 | * | 5/2007 | Hoshizawa et al. | 369/47.5 |

FOREIGN PATENT DOCUMENTS

| | | |
|---|---|---|
| JP | 9-305549 | 11/1997 |
| JP | 11-338029 | 12/1999 |
| JP | 3150242 | 3/2001 |

* cited by examiner

*Primary Examiner*—Bryce P Bonzo
(74) *Attorney, Agent, or Firm*—Fildes & Outland, P.C.

(57) ABSTRACT

A computer readable medium stores a program causing a computer to execute a process for error recovery. The process includes: when an error is detected during transfer of dummy data for maintaining a link, executing device reset to recover from the error, and monitoring whether or not another error occurs during an error monitoring period starting from the device reset; when the other error occurs during the error monitoring period, executing the device reset to recover from the other error, monitoring whether or not still another error occurs during the error monitoring period starting from the device reset; counting number of the successive error monitoring periods in each of which the error occurs; and judging an error occurrence state based on a result of the counting.

9 Claims, 10 Drawing Sheets

COMPUTER READABLE MEDIUM STORING AN ERROR RECOVERY PROGRAM, ERROR RECOVERY METHOD, ERROR RECOVERY APPARATUS, AND COMPUTER SYSTEM

BACKGROUND

1. Technical Field

This invention relates to a computer readable medium storing an error recovery program, an error recovery apparatus, an error recovery method and a computer system.

2. Related Art

There is a system such as an optical communication system, which does not respond to a data communication request rapidly unless any data communications is always conducted for maintaining a communication link even when effective data is not being transferred. In such a system, an error may occur in a transmission path even when effective data is not being transferred.

SUMMARY

According to an aspect of the invention, a computer readable medium stores a program causing a computer to execute a process for error recovery. The process includes: when an error is detected during transfer of dummy data for maintaining a link, executing device reset to recover from the error, and monitoring whether or not another error occurs during an error monitoring period starting from the device reset; when the other error occurs during the error monitoring period, executing the device reset to recover from the other error, monitoring whether or not still another error occurs during the error monitoring period starting from the device reset; counting number of the successive error monitoring periods in each of which the error occurs; and judging an error occurrence state based on a result of the counting.

BRIEF DESCRIPTION OF THE DRAWINGS

Exemplary embodiments will be described in detail below with reference to the accompanying drawings wherein.

In the accompanying drawings.

DETAILED DESCRIPTION

First Exemplary Embodiment

Figure 1:
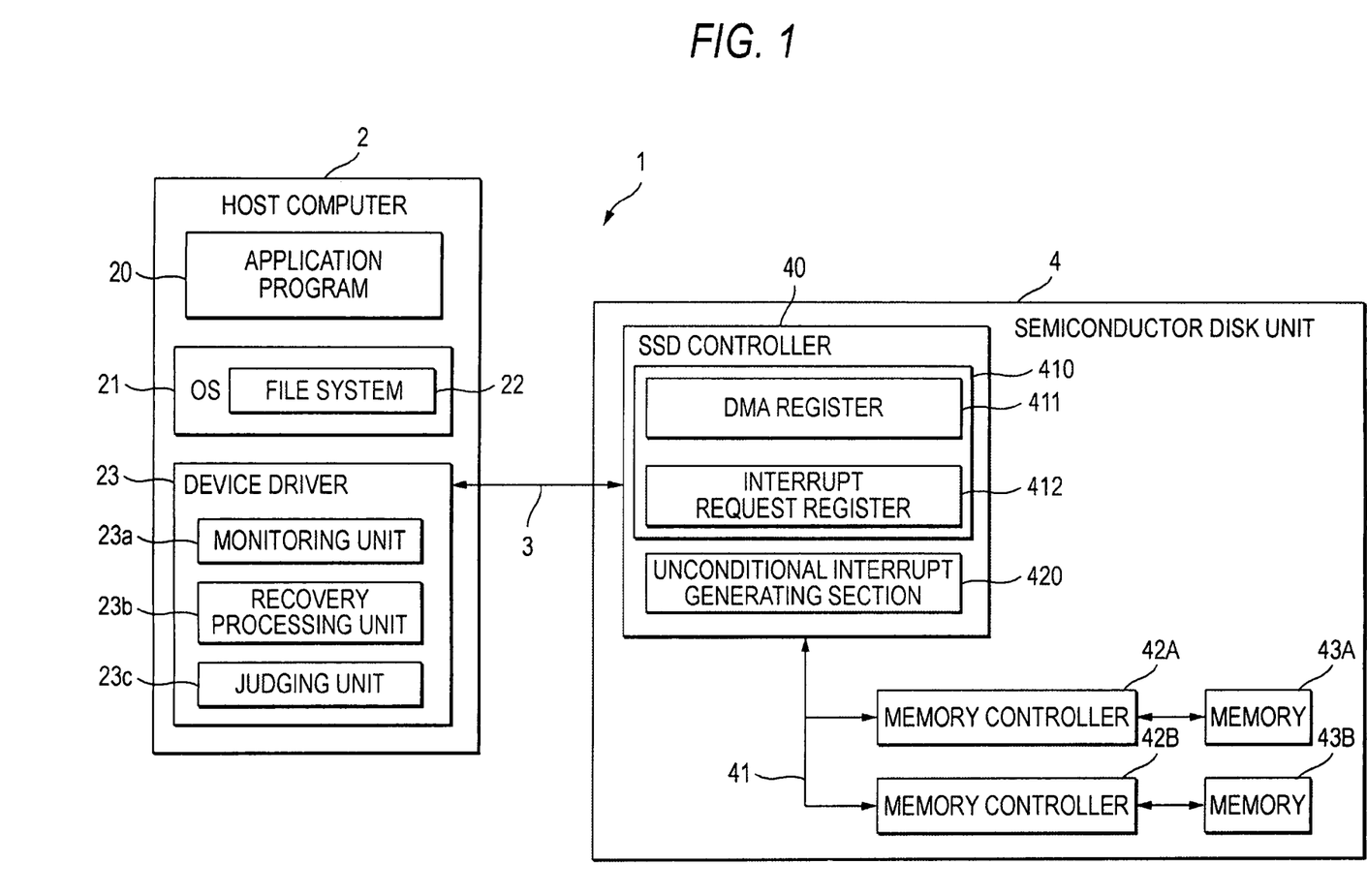
FIG. 1 is a block diagram to show a computer system according to a first exemplary embodiment of the invention.

FIG. 1 is a block diagram to show a computer system 1 according to a first exemplary embodiment of the invention. This computer system 1 includes a host computer 2 serving as an error recovery apparatus and a semiconductor disk unit 4 serving as external storage device connected to the host computer 2 by a serial interface 3 of PCI Express (registered trademark). Although one external storage device is connected to the host computer 2 in FIG. 1, two or more external storage devices may be connected thereto.

The host computer 2 has an application program 20 such as a document processing program, an operating system (OS) 21, a file system 22 built in the OS 21, and a device driver 23 for controlling the semiconductor disk unit 4. The application program 20, the OS 21, the file system 22, and the device driver 23 are stored in an HDD, and are executed by a CPU (not shown). The device driver 23 may be input into the host computer 2 from a recording medium such as a CD-ROM or may be input into the host computer 2 through a network such as the Internet.

If an error occurs while effective data is being transferred or while dummy data for maintaining the link is being transferred, the device driver 23 performs error recovery processing as shown in flowcharts of FIGS. 4 to 6 described later. As shown in FIG. 1, the device driver 23 includes a monitoring unit 23a, a recovery processing unit 23b and a judging unit 23c.

The semiconductor disk unit 4 includes a semiconductor disk (SSD) controller 40, memory controllers 42A and 42B connected to the SSD controller 40 by an internal bus 41, and memories 43A and 43B. The memories 43A and 43B serve as semiconductor memory and are connected to the memory controllers 42A and 42B.

The memories 43A and 43B may be volatile memory such as DRAM or SRAM or nonvolatile memory. Two pairs of the memory controllers 42A, 42B and the memories 43A, 43B are used in FIG. 2. However, the invention is not limited to the two pairs.

The internal bus 41 is implemented as an optical bus. The optical bus includes an optical waveguide, an incidence optical fiber optically coupled with the light-incidence end face of the optical waveguide, an emission optical fiber optically coupled with the light-emission end face of the optical waveguide, an electric-optic converter placed on the incidence side of the incidence optical fiber, and a photoelectric converter placed on the emission side of the emission optical fiber. The internal bus 41 is not limited to an optical bus and may be implemented as electric signal lines.

The SSD controller 40 includes a register group 410 and an unconditional interrupt generating section 420. The register group 410 includes registers such as a DMA register 411 in which information concerning DMA (direct memory access) (e.g., source address, destination address and data length) is set and an interrupt request register 412 in which an interrupt request is set. The unconditional interrupt generating section 420 generates an unconditional interrupt based on contents of the interrupt request register 412.

Figure 2:
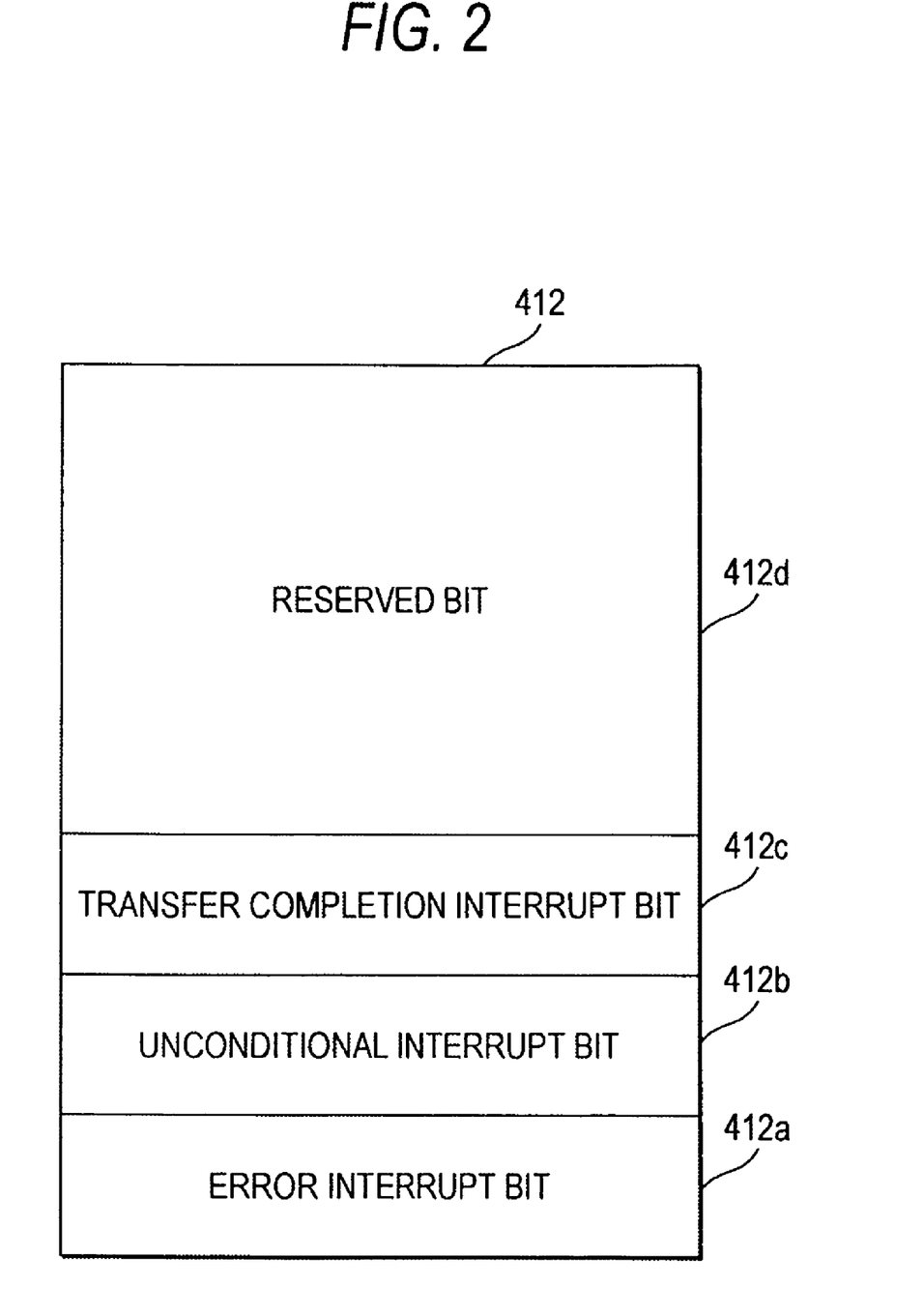
FIG. 2 is a drawing to show the configuration of an interrupt request register in FIG. 1.

FIG. 2 shows the interrupt request register 412. The interrupt request register 412 includes an error interrupt bit 412a, an unconditional interrupt bit 412b, a transfer completion interrupt bit 412c and a reserved bit 412d.

Operation of First Exemplary Embodiment

Next, the operation of the system 1 will be described with reference to FIGS. 3 to 6. FIG. 6 is a flowchart to show the operation of the host computer 2.

(1) Transfer of Effective Data

Figure 3:
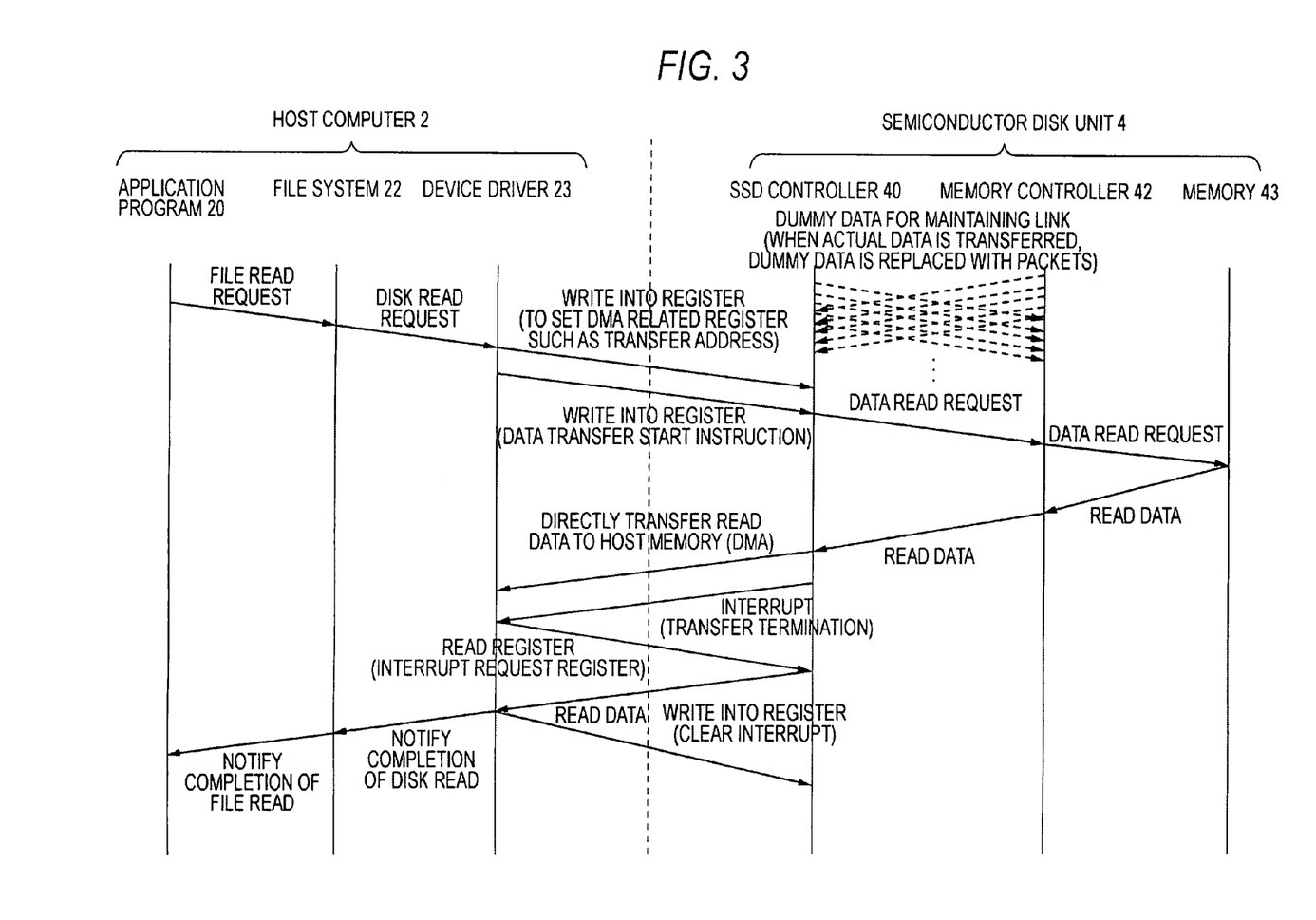
FIG. 3 is a flowchart to show the whole operation of the computer system according to the first exemplary embodiment of the invention.

FIG. 3 is a flowchart of the whole system 1 for transferring effective data (reading data).

When the application program 20 of the host computer 2 makes a file read request through the file system 22, the device driver 23 writes into the register of the SSD controller 40 to set information concerning DMA such as the source address and instructs the SSD controller 40 to start DMA transfer.

The SSD controller 40 sets the information concerning DMA in the DMA register 411 of the register group 410 and sends a data read request to the memory controller 42 according to the data transfer start instruction from the device driver 23. Dummy data for maintaining the link is also transmitted and received between the SSD controller 40 and the memory controller 42 through the internal bus 41 while effective data is not being transferred.

The memory controller 42 reads data from the memory 43 and transfers the read data to the SSD controller 40. The SSD controller 40 transfers the read data directly to a memory of the host computer 2 (DMA transfer). When the transfer is completed, the SSD controller 40 writes "1" into the transfer completion interrupt bit 412c of the interrupt request register 412 and interrupts the device driver 23 (transfer termination).

Figure 6:
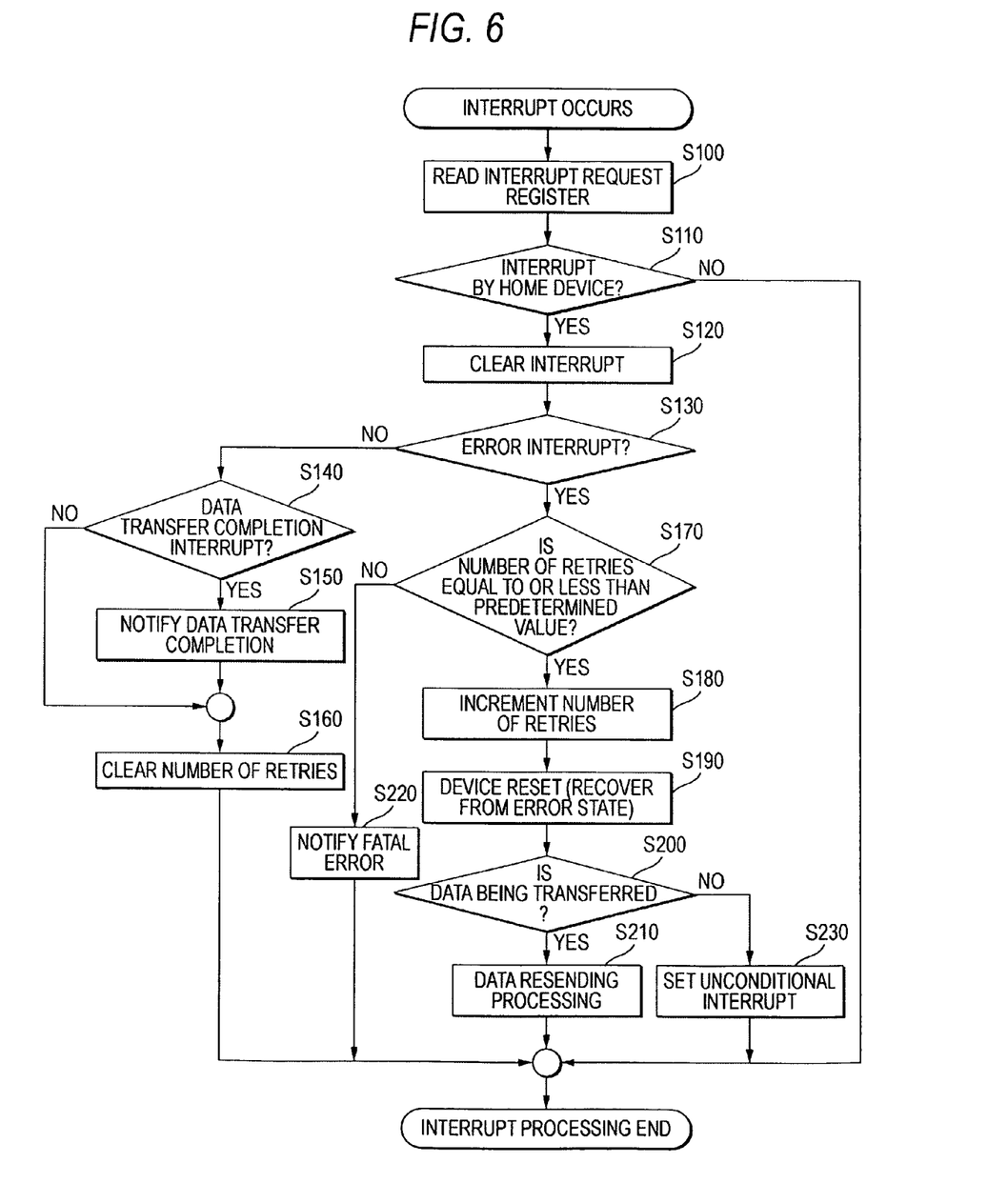
FIG. 6 is a flowchart to show the operation of a host computer according to the first exemplary embodiment of the invention.

Next, as shown in FIG. 6, when the device driver 23 reads the interrupt request register 412 (S100) and confirms that the interrupt is performed the semiconductor disk unit 4 (home device) (YES at S110), the device driver 23 sets clear of the transfer termination interrupt in the SSD controller 40 (S120). The SSD controller 40 clears the transfer completion interrupt bit 412c of the interrupt request register 412.

The device driver 23 determines whether or not the interrupt is an error interrupt (S130). If the device driver 23 determines that the interrupt is not an error interrupt (NO at S130), the device driver 23 determines whether or not the interrupt is a data transfer completion interrupt (S140). If the interrupt is a data transfer completion interrupt (YES at S140), the device driver 23 notifies disk read completion to the file system 22, which then notifies file read completion to the application program 20 (S150). Then, the device driver 23 clears number of retries (S160), and the interrupt processing is completed.

(2) If an Error Occurs during Transfer of Effective Data

If an error occurs during transfer of effective data, the SSD controller 40 writes "1" into the error interrupt bit 412a of the interrupt request register 412. When the device driver 23 reads the interrupt request register 412 (S100) and confirms that the interrupt is an interrupt of the home device (YES at S110), the device driver 23 sets clear of the error interrupt in the SSD controller 40 (S120). The SSD controller 40 clears the error interrupt bit 412a of the interrupt request register 412.

The device driver 23 (the monitoring unit 23a) determines whether or not the interrupt is an error interrupt (S130). If the device driver (the monitoring unit 23a) determines that the interrupt is an error interrupt (YES at S130), the device driver 23 (the judging unit 23c) determines whether or not the number of retries is equal to or less than a predetermined value (S170). If the device driver 23 (the judging unit 23c) determines that the number of retries is equal to or less than the predetermined value (YES at S170), the device driver 23 (the judging unit 23c) increments the number of retries (S180) and then the device driver 23 (the recovery processing unit 23b) executes device reset, namely, recovers from the error state (S190). By executing the reset device, the registers of the register group 410 are cleared.

Next, the device driver 23 determines whether or not data is being transferred at present (S200). If the device deriver 23 determines that data is being transferred (YES at S200), the device driver 23 executes data resending processing (S210). The interrupt processing is completed.

If an error occurs again after the data is resent, the steps S100, S110, S120, S130, S170, S180, S190, S200 and S210 are repeatedly executed. If the number of successive resending times (retries) during the data transfer exceeds the predetermined value (NO at S170), the device driver 23 notifies a fatal error (S220). As the notification of a fatal error, for example, an LED lamp may be lighted, a message may be displayed on a display, an alarm sound may be produced by a buzzer, or a voice message may be output from a loudspeaker.

(3) If an Error Occurs during Transfer of Dummy Data for Maintaining the Link (Error during Data Transfer from Memory Controller 42 to SSD Controller 40)

Figure 4:
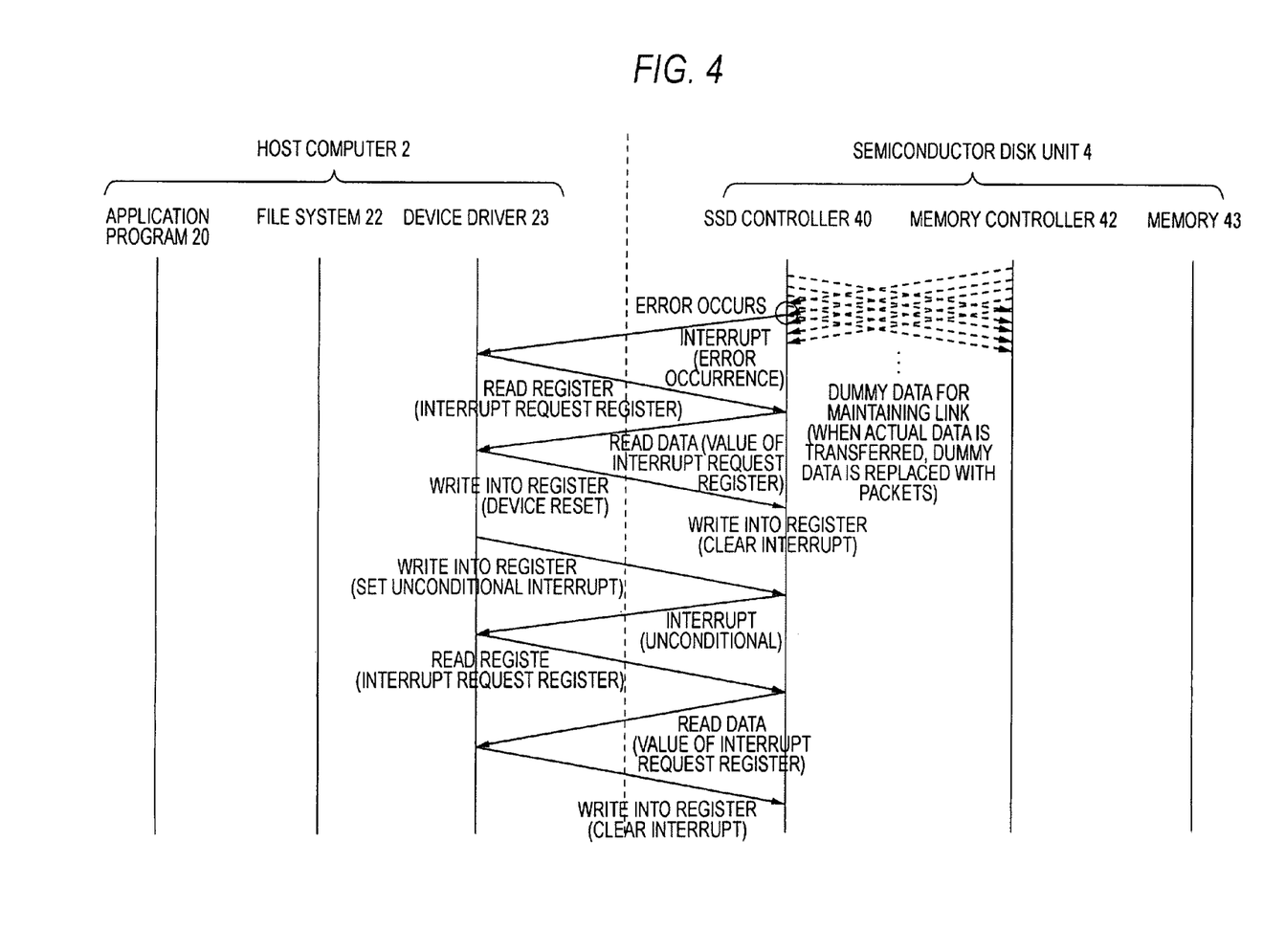
FIG. 4 is a flowchart to show the whole operation of the computer system according to the first exemplary embodiment of the invention.

FIG. 4 is a flowchart of the whole system 1 if an error occurs during transfer of dummy data for maintaining the link from the memory controller 42 to the SSD controller 40.

If an error occurs during transfer of dummy data for maintaining the link from the memory controller 42 to the SSD controller 40 and the SSD controller 40 detects the error, the SSD controller 40 writes "1" into the error interrupt bit 412a of the interrupt request register 412 and interrupts the device driver 23 (error occurrence).

When the device driver 23 reads the interrupt request register 412 (S100) and confirms that the interrupt is an interrupt of the home device (YES at S110), the device driver 23 sets clear of the error interrupt in the SSD controller 40 (S120). The SSD controller 40 clears the error interrupt bit 412a of the interrupt request register 412.

The device driver 23 (the monitoring unit 23a) determines whether or not the interrupt is an error interrupt (S130). If the device driver 23 (the monitoring unit 23a) determines that the interrupt is an error interrupt (YES at S130), the device driver 23 (the judging unit 23c) determines whether or not the number of retries is equal to or less than a predetermined value (S170). If the number of retries is equal to or less than the predetermined value (YES at S170), the device driver 23 (the recovery processing unit 23b) resets the device (S190). By executing the device reset, the registers of the register group 410 are cleared.

After resetting the device, the device driver 23 (the recovery processing unit 23b) performs error recovery processing and determines whether or not data is being transferred at present (S200). If data is not being transferred at present (NO at S200), the device driver 23 sets an unconditional interrupt in the SSD controller 40 (S230). The SSD controller 40 writes "1" into the unconditional interrupt bit 412b of the interrupt request register 412.

The SSD controller 40 interrupts the device driver 23 (unconditional interrupt; an interrupt made by software (CPU) independently from a status of a hardware will be referred to as the "unconditional interrupt"). When the device driver 23 reads the interrupt request register 412 (S100) and confirms that the interrupt is an interrupt of the home device (YES at S110), the device driver 23 sets clear of the unconditional interrupt in the SSD controller 40 (S120). The SSD controller 40 clears the unconditional interrupt bit 412b of the interrupt request register 412.

At this time, the interrupt processing is completed. However, since "1" is set in the unconditional interrupt bit 412b, the interruption processing is performed again. The other interruption processing will be described below.

After the device reset (S190), if an error occurs before the device deriver 23 reads the interrupt request register 412, the device driver 23 (the monitoring unit 23a) determines the interrupt as the error interrupt (Yes at S130). In this case, if the number of retries is equal to or less than the predetermined value (Yes at S170), the device driver 23 (the judging unit 23c) increments the number of retries (S180), (the recovery processing unit 23b) executes device reset (S190) and sets the unconditional interrupt (S230). That is, if an error occurs within a predetermined period (until the interrupt request register is read out; may be referred to as an "error monitoring period") from the device reset (S190), the device driver 23 reads the interrupt request register 412, clears the interrupt (S120), confirms that the number of retries is equal to or less than the predetermined value (YES at S170), increments the number of retries (S180), executes device reset (S190), and sets the unconditional interrupt (S230).

If the number of retries exceeds the predetermined value (NO at S170), the device driver 23 notifies a fatal error (S220) as described above.

On the other hand, if no error occurs after the device reset is executed (S190) and before the interrupt request register is read out (S100), the device driver 23 (the monitoring unit 23a) determines the interrupt as the error interrupt (No at S130). In this case, the device driver 23 determines that the interrupt is not data transfer completion interrupt (No at S140), clears the number of retries (S160) and completes the interrupt processing.

(4) If an Error Occurs during Transfer of Dummy Data for Maintaining the Link (Error during Data Transfer from SSD Controller 40 to Memory Controller 42)

Figure 5:
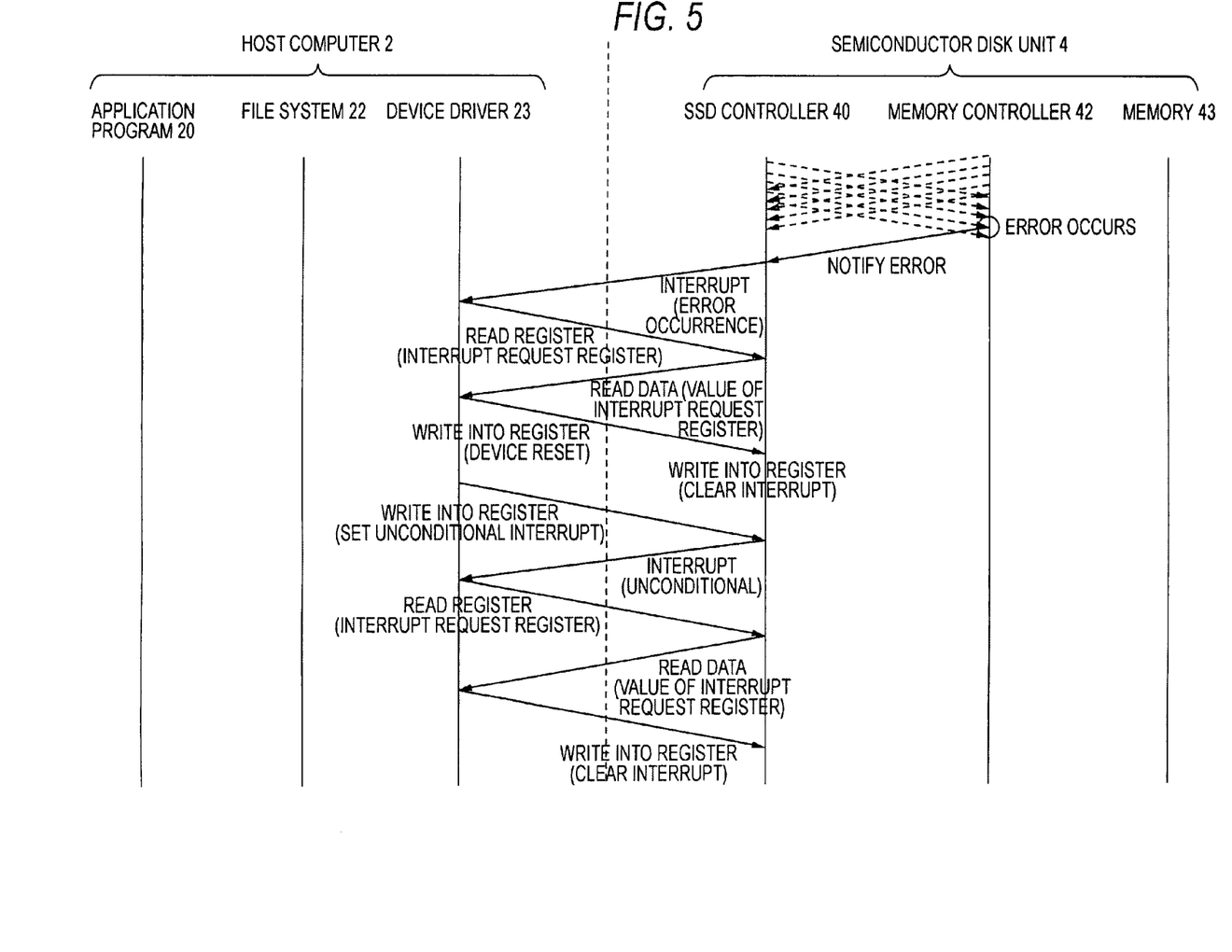
FIG. 5 is a flowchart to show the whole operation of the computer system according to the first exemplary embodiment of the invention.

FIG. 5 is a flowchart of the whole system 1 if an error occurs during transfer of dummy data for maintaining the link from the SSD controller 40 to the memory controller 42. If an error occurs during transfer of dummy data for maintaining the link from the SSD controller 40 to the memory controller 42 and the memory controller 42 detects the error, the memory controller 42 notifies the error to the SSD controller 40. The SSD controller 40 writes "1" into the error interrupt bit 412a of the interrupt request register 412. The subsequent operation is similar to that previously described with reference to FIG. 4 and therefore, will not be discussed again.

Figure 7:
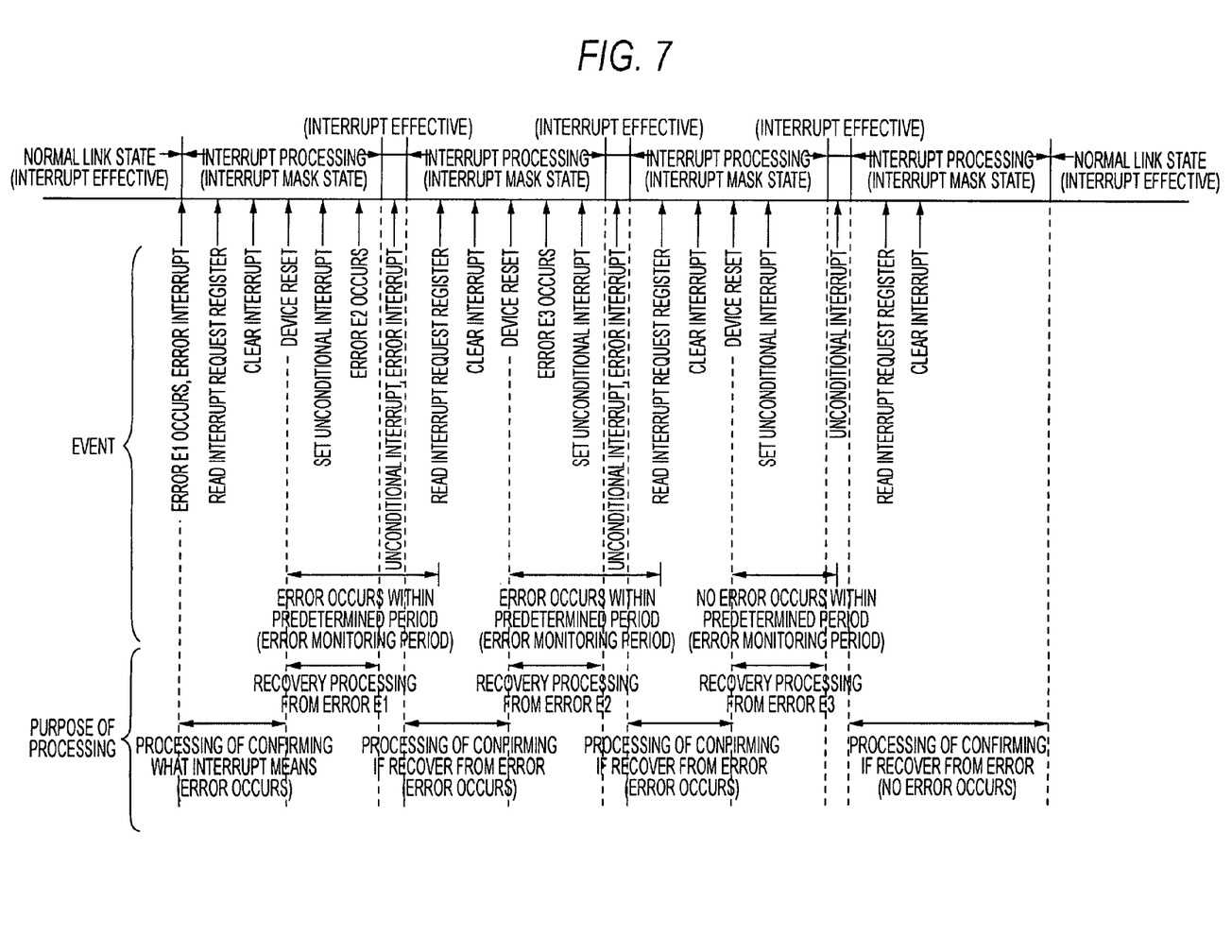
FIG. 7 is a timing chart to show the operation of the host computer according to the first exemplary embodiment of the invention.

FIG. 7 is a timing chart of the case where three successive errors occur during transfer of dummy data for maintaining the link. In FIG. 7, the "error monitoring period" is a period from the device reset to the reading out of the interrupt request register 412.

If error E1 occurs during transfer of dummy data for maintaining the link, the device driver 23 (the recovery processing unit 23b) executes performs recovery processing from the error E1. The "recovering processing" includes performing of the device reset and setting of the unconditional interrupt.

The device driver 23 executes the interrupt processing from occurrence of an error interrupt caused by the error E1 to the completion of the recovery processing from the error E1. The device driver 23 performs the interrupt processing by accessing the interrupt request register 412 determining and the interrupt request set in the interrupt request register 412. Access to the interrupt request register 412 is made to wait until preceding interrupt processing (access) is completed. When the interrupt processing is completed, the device driver 23 performs the unconditional interrupt and performs next interrupt processing.

If an error E2 occurs within the predetermined period from the device reset (error monitoring period) to the reading out of the interrupt request register 412, the device driver 23 executes the device reset again, executes the recovery processing from the error E2, and sets the unconditional interrupt.

Further, if error E3 occurs within the predetermined period from the device reset to the reading out of the interrupt request register 412, the device driver 23 executes the device reset again, executes the recovery processing from the error E3, and sets the unconditional interrupt.

If still another error does not occur within the predetermined period from the device reset to reading out of the interrupt request register 412, the device driver terminals the error monitoring.

Thus, if more than one error monitoring period in which an error occurs continues and the setup number (counted number) of the error monitoring periods exceeds a predetermined value, the device driver 23 notifies a fatal error. If the number of the successive error monitoring periods is equal to or less than the predetermined value, the device driver 23 determines that no fatal error occurs.

Second Exemplary Embodiment

Figure 8:
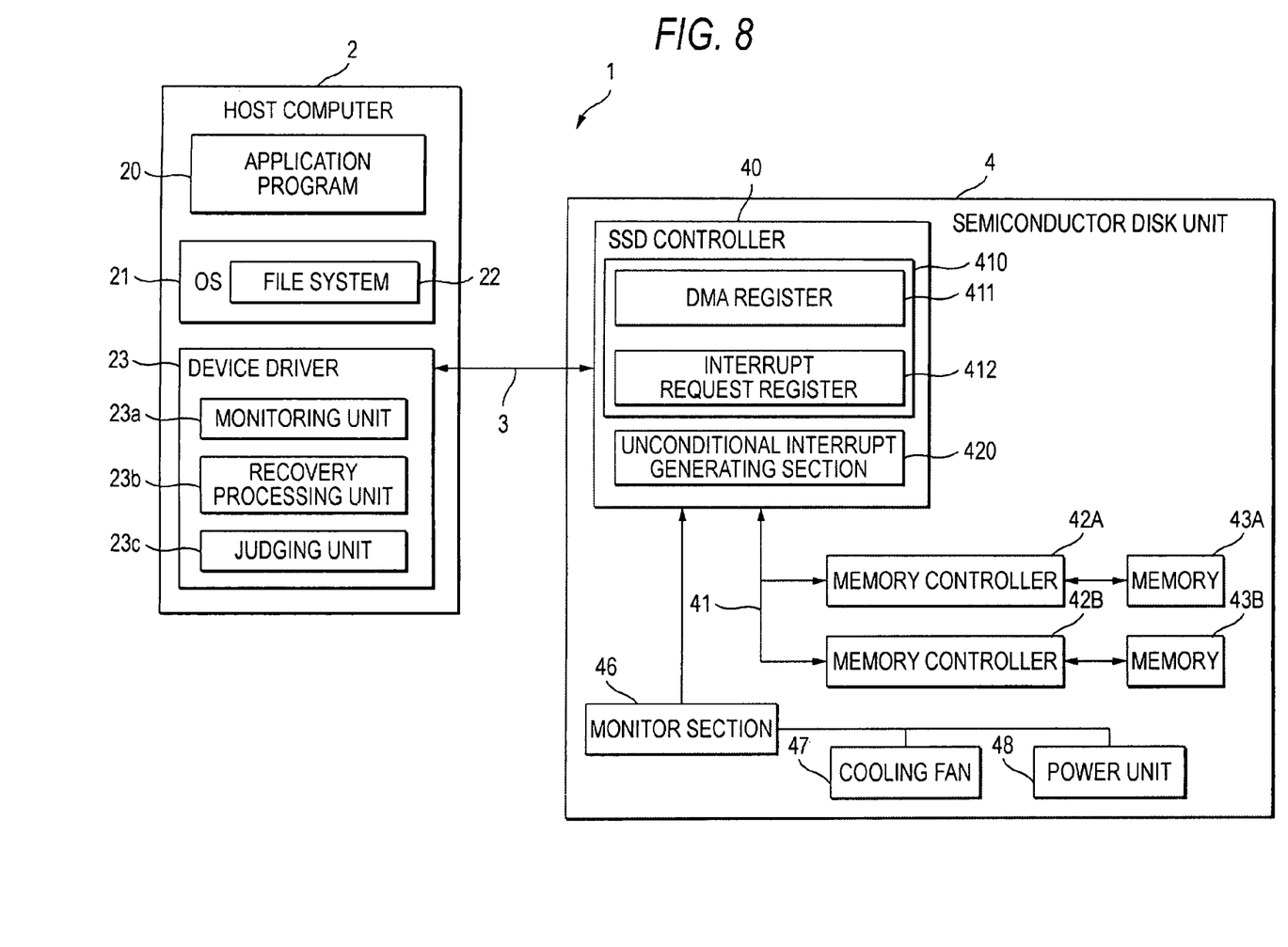
FIG. 8 is a block diagram to show a computer system according to a second exemplary embodiment of the invention.

FIG. 8 is a block diagram of a computer system according to a second exemplary embodiment of the invention. The second exemplary embodiment differs from the first exemplary embodiment in that it is also provided with a cooling fan 47 installed in a semiconductor disk unit 4 for emitting heat in the unit 4 to the outside, a power unit 48 for supplying power to the components of the semiconductor disk unit 4, and a monitor section 46 for monitoring the drive state of the cooling fan 47 and the power unit 48. When the cooling fan 47 stops, when power supply from the power unit 48 stops, when the supplied voltage drops, etc., the monitor section 46 sends notification of the error occurring in the cooling fan 47 or the power unit 48 to an SSD controller 40 as an unrecoverable fatal error.

As an anomaly in the semiconductor disk unit 4, any other anomaly of a rise in the unit temperature, etc., may be monitored in addition to the anomalies of the cooling fan 47 and the power unit 48.

Figure 9:
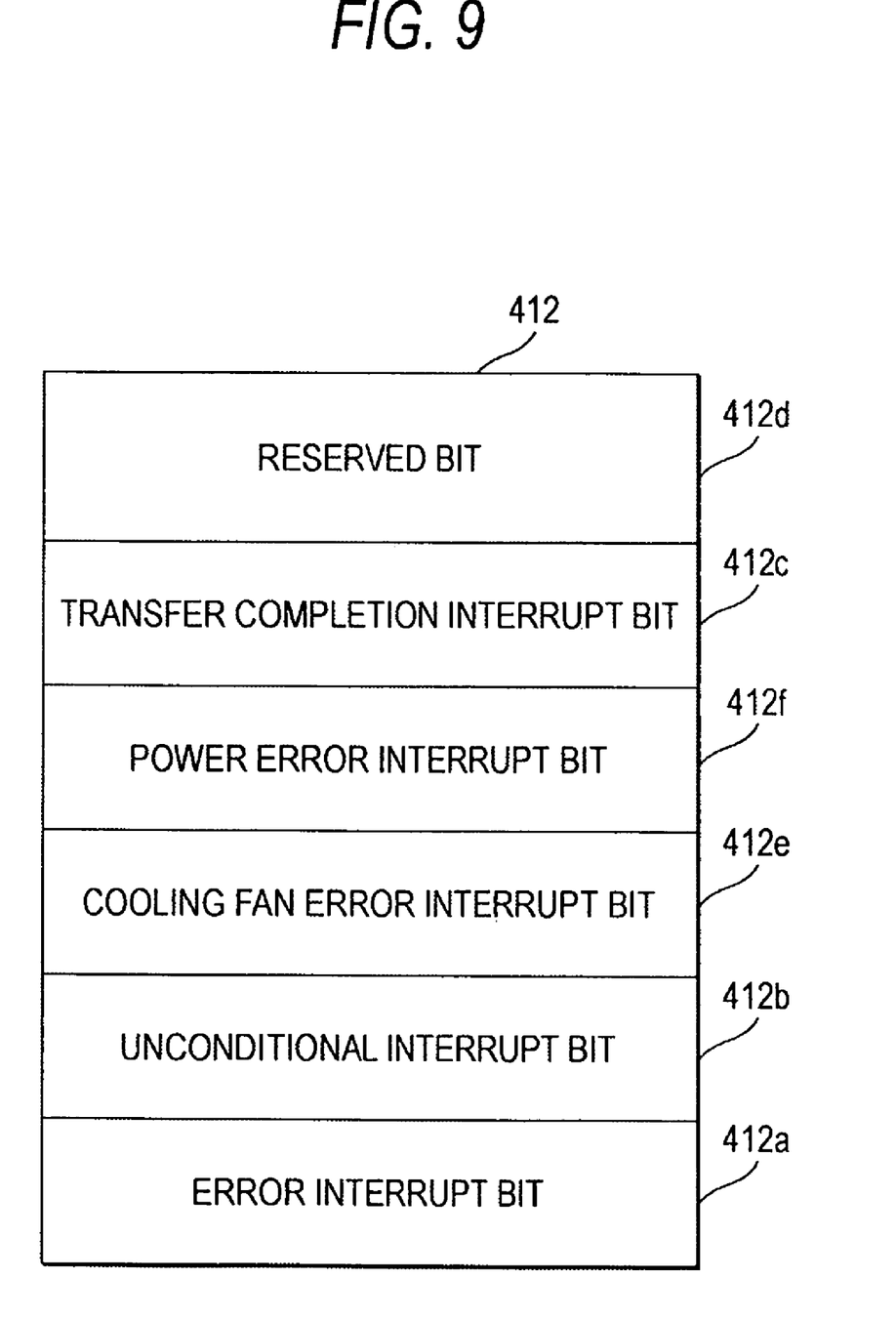
FIG. 9 is a drawing to show the configuration of an interrupt request register in FIG. 8.

An interrupt request register 412 includes an error interrupt bit 412a, an unconditional interrupt bit 412b, a transfer completion interrupt bit 412c, a reserved bit 412d, a cooling fan error interrupt bit 412e, and a power error interrupt bit 412f.

Operation of Second Exemplary Embodiment

Figure 10:
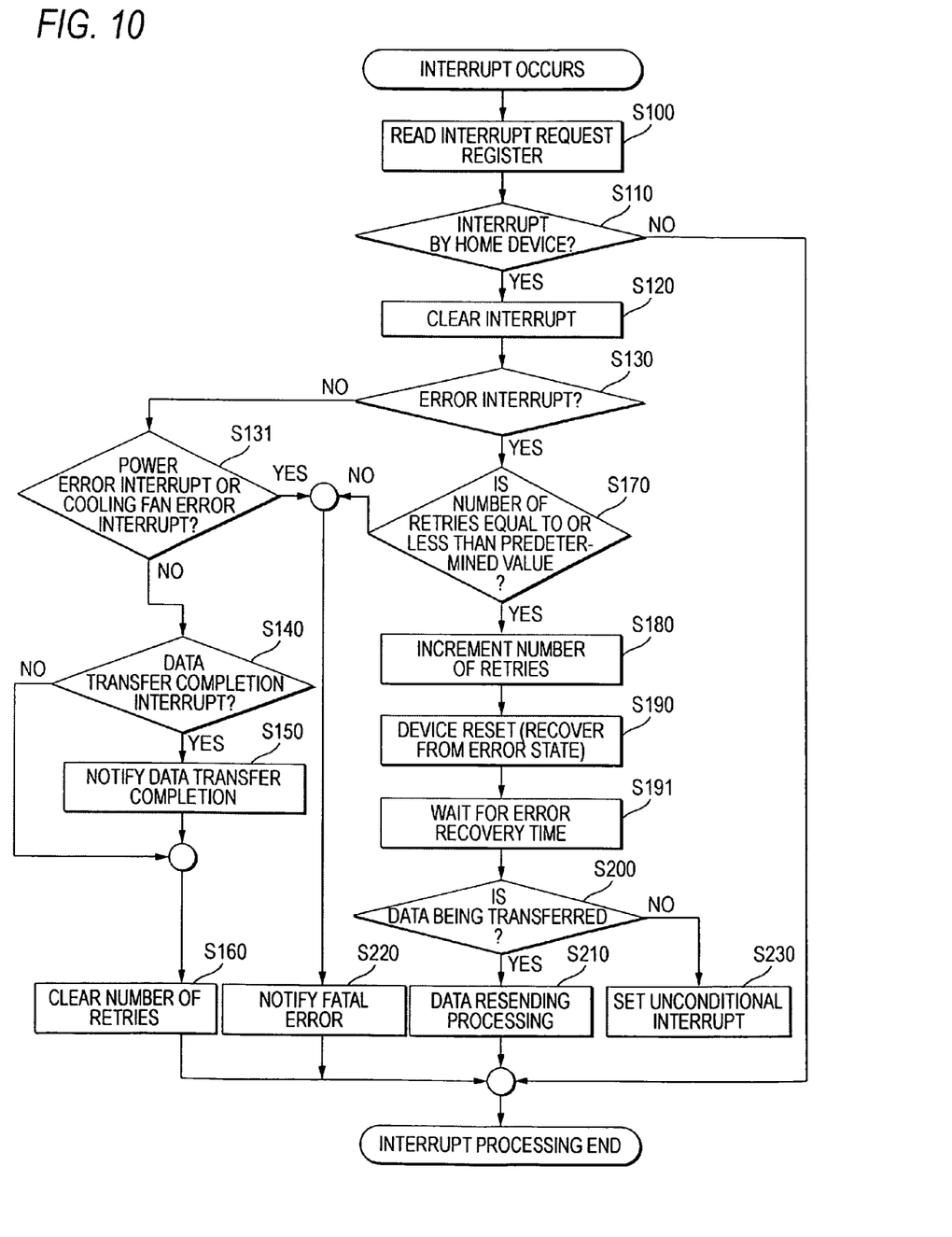
FIG. 10 is a flowchart to show the operation of a host computer according to the second exemplary embodiment of the invention.

FIG. 10 is a flowchart to show the operation of a host computer 2. When the monitor section 46 detects an anomaly in the cooling fan 47 or the power unit 48, it sends notification of the anomaly to the SSD controller 40. "1" is written into the cooling fan error interrupt bit 412e or the power error interrupt bit 412f of the interrupt request register 412, and a device driver 23 is interrupted.

When the device driver 23 reads the interrupt request register 412 (S100) and checks that the interrupt is an interrupt of the home device (YES at S110), the device driver 23 sets clear of the error interrupt for the SSD controller 40 (S120). The SSD controller 40 clears the error interrupt bit 412a of the interrupt request register 412.

The device driver 23 determines whether or not the interrupt is an error interrupt (S130) and if the interrupt is an error interrupt (YES at S130), the device driver 23 determines whether or not the number of retries is equal to or less than a predetermined value (S170) and if the number of retries is equal to or less than the predetermined value (YES at S170), the device driver 23 executes device reset (S190). As the reset device is executed, registers in a register group 410 are cleared.

After device reset is executed, recovery processing from the error is performed. After waiting for a predetermined error recovery time, the device driver 23 determines whether or not data is being transferred at present (S200). Since the recovery processing from the error contains power check and cooling fan check, longer recover time than that in the first exemplary embodiment is required.

If data is not being transferred at present (NO at S200), the device driver 23 sets an unconditional interrupt (S230). The SSD controller 40 writes "1" into the unconditional interrupt bit 412b of the interrupt request register 412. If data is being transferred at present (YES at S200), the data is resent (S210).

If the interrupt is not an error interrupt (NO at S130), whether or not the interrupt is a power error interrupt or a cooling fan error interrupt is determined (S131). If the interrupt is not a power error interrupt or a cooling fan error interrupt (NO at S131), whether or not the interrupt is a data transfer completion interrupt is determined (S140). If the interrupt is a data transfer completion interrupt (YES at S140), notification of disk read completion is sent to a file system 22, which then sends notification of file read completion to an application program 20 (S150), the number of retries is cleared (S160), and the interrupt processing terminates.

If the interrupt is a power error interrupt or a cooling fan error interrupt (YES at S131), the device driver 23 sends notification of a fatal error (S220) as in the first exemplary embodiment.

Other Embodiments

It is to be understood that the invention is not limited to the above-described specific embodiments thereof and various modifications and changes may be made without departing from the spirit and the scope of the invention.

In the exemplary embodiments described above, the error recovery processing is implemented as software, but the whole or a part of the error recovery processing may be implemented as hardware.

In the exemplary embodiments described above, the error recovery processing performed when an error or an anomaly occurs in the semiconductor disk unit has been described, but the invention can also be applied in a similar manner if a transmission error occurs on the serial interface.

What is claimed is:

1. A computer readable medium storing a program causing a computer to execute a process for error recovery, the process comprising:
   when an error is detected during transfer of dummy data for maintaining a link, executing device reset to recover from the error, and monitoring whether or not another error occurs during an error monitoring period starting from the device reset;
   when the other error occurs during the error monitoring period, executing the device reset to recover from the other error, monitoring whether or not still another error occurs during the error monitoring period starting from the device reset;
   counting number of the successive error monitoring periods in each of which the error occurs; and
   judging an error occurrence state based on a result of the counting.

2. The medium according to claim 1, wherein the judging comprises when the result of the counting exceeds a predetermined value, notifying that the result of the counting exceeds that predetermined value.

3. The medium according to claim 1, wherein:
   the monitoring whether or not the other error occurs comprises:
      setting an unconditional interrupt in an interrupt request register, an error interrupt being set in the interrupt request register when an error occurs;
      unconditionally interrupting after the recovering from the error is completed; and
      reading the interrupt request register, and
   the monitoring whether or not the still other error occurs comprises:
      setting the unconditional interrupt in the interrupt request register;
      unconditionally interrupting after the recovering from the other error is completed; and
      reading out from the interrupt request register.

4. The medium according to claim 3, wherein the process further comprising:
   detecting whether or not a failure occurs in an external storage device, and
   when the failure is detected, notifying that the failure occurs in the external storage device.

5. An error recovery method comprising:
   when an error is detected during transfer of dummy data for maintaining a link, executing device reset to recover from the error, and monitoring whether or not another error occurs during an error monitoring period starting from the device reset;
   when the other error occurs during the error monitoring period, executing the device reset to recover from the other error, monitoring whether or not still another error occurs during the error monitoring period starting from the device reset;
   counting number of the successive error monitoring periods in each of which the error occurs; and
   judging an error occurrence state based on a result of the counting.

6. An error recovery apparatus comprising:
   a monitoring unit that monitors whether or not an error occurs during an error monitoring period after device reset is executed;
   a recovery processing unit that, when an error occurs during transfer of dummy data for maintaining link or during the error monitoring period, executes the device reset to recover from the error; and
   a judging unit that counts number of the successive error monitoring periods in each of which the error occurs, the judging unit that judges an error occurrence state based on a result of the counting.

7. A computer system comprising:
   an external storage device; and
   a computer that accesses the external storage device, wherein:
   the external storage device comprises:
      an interrupt request register in which an interrupt corresponding to an interrupt request is set; and an unconditional interrupt generating section that causes an unconditional interrupt to occur, based on completion of recovery from an error and a setting of the unconditional interrupt, and the computer comprises:

a monitoring unit that reads the interrupt request register based on the unconditional interrupt after device reset is executed, the monitoring unit that monitors whether or not an error occurs during an error monitoring period from the device reset to the reading of the interrupt request register;

a recovery processing unit that, when an error occurs during transfer of dummy data for maintaining link or during the error monitoring period, executes the device reset to recover from the error; and a judging unit that counts number of the successive error monitoring periods in each of which the error occurs, the judging unit that judges an error occurrence state based on a result of the counting.

8. The computer system according to claim 7, wherein the external storage device further comprises:

a main controller; and a plurality of memory controllers connected to the main controller via an optical bus.

9. The computer system according to claim 7, wherein the external storage device is a semiconductor disk device.

* * * * *